United States Patent

[11] 3,624,032

| [72] | Inventors | James J. Miyashiro |
| | | Woodstock; |
| | | Alfred W. Seiling, Crystal Lake, both of Ill. |
| [21] | Appl. No. | 819,519 |
| [22] | Filed | Apr. 24, 1969 |
| [45] | Patented | Nov. 30, 1971 |
| [73] | Assignee | Morton International, Inc. |

[54] EPOXY COMPOSITIONS CURED WITH CARBOXYLIC ACID ANHYDRIDES AND METALLIC SALT OF ACETYLACETONE
14 Claims, No Drawings

[52] U.S. Cl. ............................................. 260/47 EC,
117/161 ZB, 260/37 EP, 260/59, 260/78.4 EP
[51] Int. Cl. ......................................................... C08g 30/12
[50] Field of Search ........................................... 260/47 EP,
47 C, 78.4 EP, 2 EP, 2 A, 59

[56] References Cited
UNITED STATES PATENTS

| 2,876,208 | 3/1959 | Naps ............................ | 260/47 EPC X |
| 3,242,145 | 3/1966 | Martin........................... | 260/78.5 X |
| 3,362,922 | 1/1968 | Manasia et al................. | 260/47 EPC X |

Primary Examiner—William H. Short
Assistant Examiner—T. Pertilla
Attorney—Hofgren, Wegren, Allen, Stellman & McCord ABSTRACT: A curable epoxy composition comprising an epoxy resin, a polycarboxylic acid anhydride curing agent, and, as a cure catalyst, a polyvalent metal complex of acetylacetone said composition, having improved storage stability, and thermoset properties, and a process for the preparation thereof.

EPOXY COMPOSITIONS CURED WITH CARBOXYLIC ACID ANHYDRIDES AND METALLIC SALT OF ACETYLACETONE

BACKGROUND OF THE INVENTION

1. Field of the Invention

This invention relates to epoxy compositions particularly to those used in molding operations such as transfer, compression, or injection molding.

Among the uses for these compositions is that of formation into parts for use with, or encapsulating, electronic parts which are sensitive to shock, abrasion, temperature and moisture. The encapsulation process requires the use of compositions which will attain a hard, moisture and solvent resistant, insulating state without requiring excessively high temperatures for curing which may damage the object encapsulated.

2. Description of the Prior Art

It is known to prepare epoxy compositions containing an epoxy resin, a curing agent in an amount sufficient to cure the resin and an accelerator or catalytic agent. Polycarboxylic acid anhydride curing agents in generally stoichiometric quantities and a variety of other curing agents have been used.

Generally, epoxy compositions containing an anhydride cure at a rather slow rate and then only at elevated temperatures. When encapsulating electronic parts, excessively high cure temperatures may cause damage to the part. It is therefore sometimes necessary to use a catalyst which permits both faster curing and curing at a temperature lower than that which impairs the properties of the material sought to be protected.

Such compositions are known in one component package systems. However, a disadvantage of some of these prior art epoxy molding compositions is that when a catalyst is introduced in order to achieve a lower curing temperature, the composition becomes sufficiently reactive to cause poor storage life. Consequently, they cannot be stored for extended periods of time in a premixed state. The composition is usually preserved by refrigerating until it is used.

Another disadvantage of some conventional compositions is that even when cured under optimum conditions they do not reach as complete a cure as desirable thereby failing to achieve sufficient solvent and moisture resistance, hardness and insulation properties or the catalyst system sometimes causes a decrease in moisture resistance, especially at the surface of the molded product. The completeness of cure with its resulting effect on these properties is hereinafter referred to as "quality of cure."

Starck et al. in U.S. Pat. No. 2,801,228, which was found during a patentability search after the present applicant's discovery, discloses an epoxy resin hardening process utilizing acetylacetone metal complexes and emphasizes compounds in which the metals are easily split off from the remainder of the molecule. So far as is known, this system has never found commercial application. According to Starck et al. the metal complex "hardening agents" are used in large amounts and cure times of about 30 minutes are achieved. Such cure time are rather long for epoxy molding compositions for certain applications. Also, the high ionic contamination caused by the high content of meal complex may cause a low electronic compatibility which can be undesirable in the manufacture of some electronic components. Additionally, the metal complex cured resins of Starck et al. are not highly cross linked which is desirable in some applications.

Further, although not part of the prior art, we have found during the development of this invention that some zinc complexes, e.g., the glycol-zinc complex known as IRCOGEL 2354, actually exerted an inhibiting action on the epoxy resin cure.

SUMMARY OF THE INVENTION

Broadly, this invention relates to a curable epoxy molding composition comprising an epoxy resin, a cyclic polycarboxylic acid anhydride including a dicarboxylic acid anhydride and a metal complex of acetylacetone as a cure catalyst.

The present invention provides a system in which a much wider variety of metal complexes of acetylacetone than heretofore can be used while still attaining improved curing rates. For example, some of the less expensive complexes, e.g., the zinc and ferric complexes, can be used to great advantage, when the anhydride curing agent is present. The compositions of the present invention require far less metal complex content than in a "hardening agent" system, thereby improving their properties for use in the electronic component field. In spite of the lesser amount of curing agent the rate of cure is greatly increased even when lesser amounts of anhydride curing agents are present.

As another advantage, it has been found that the system of this invention provides a product having a desirable high cross-linking density compared with the prior art "hardening agent" system.

Description of Preferred Embodiment

The epoxy resin component of the compositions of this invention may be any of those usually used in molding compounds such as, but not limited to, glycidyl ethers of phenol-formaldehyde resins, glycidyl ethers of polyphenols, cycloaliphatic epoxy compounds, and the diglycidyl ethers of bisphenol A which are formed by the reaction of a slight molar excess of epichlorohydrin with bisphenol A. These epoxy resins are commercially available under the trade names Epon 834, Epon 1001, Epon 1002, Epon 1031, Epon 1009, Epi-Rez 515 and Epi-Rez 5163; the Genepoxy resins, the Araldite resins, and the like. Epoxylated novolac resins are also useful and are available under the trade names CIBA ECN 1235, 1273, 1280, 1299, and Dow DEN 438. The epoxy resins disclosed in U.S. Pat. No 3,025,263 and the epoxy resins disclosed in the patents incorporated by reference therein are useful in the practice of this invention.

The anhydride curing agent can be any cyclic anhydride of a dicarboxylic or other polycarboxylic acid suitable for cross-linking the epoxy resin at cure temperatures. These include, but are not limited to, the following: phthalic anhydride, tetrachlorophthalic anhydride, benzophenonetetracarboxylic dianhydride (hereinafter BTDA), pyromellitic dianhydride (PMDA), the dianhydride of 1, 2, 3, 4-cyclopentanetetracarboxylic acid (hereinafter CPDA), trimellitic anhydride, trimellitic double anhydride, nadic anhydride i.e., endomethylene tetrahydrophthalic anhydride, chlorendic anhydride, hexahydrophthalic anhydride, and the like. Other useful anhydride curing agents are those available under the trade name "AMOCO,"e.g., Amoco TMX 220 which is apparently the reaction product of trimellitic acid with the diacetic acid derivative of ethylene glycol, and Amoco TMX 330 which is the reaction product of triacetin with trimellitic anhydride, both of which reaction products are apparently described by A. G. Hirsch et al. in U.S. Pat. No. 3,183,248. Such curing agents are well known in the art, and their selection or the use of other anhydride curing agents in lieu thereof is not critical to this invention.

The acetylacetonates employed in the compositions of this invention are represented by the following structural formula:

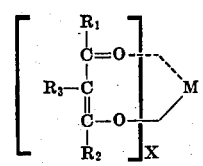

Where M is a polyvalent metal
X is an integer of at least 1 and up to the valence of M
$R_1$ and $R_2$ may contain from one to 20 carbon atoms and may be alkyl groups, aryl groups, heterocyclic radicals or halogenated hydrocarbon radicals $R_1$ and $R_2$ may be the same substituents or may be two different substituents.

$R_3$ can be any of the groups mentioned for $R_1$ and $R_2$ but more likely will be hydrogen.

The metal complexes of acetylacetone are chelates not known as particularly useful in catalyzing the epoxy anhydride compositions of this invention. Surprisingly, it was found that inclusion of certain metal acetylacetonate components in an otherwise conventional epoxy composition promotes high reactivity which brings about a high quality of cure at the moderate temperature of about 150° C., resulting in enhanced solvent resistance and completeness of cure. In spite of the high reactivity of the present compositions at moderately elevated temperatures, they display storage stability at room temperature for extended periods of time without undergoing premature reaction.

The epoxy molding compositions of this invention usually include a significant amount of inorganic fillers. Use of these fillers is conventional in molding compounds and those known to the art can be used. These fillers can be for example, calcium carbonate, silica flour, titanium dioxide, talc, mica, mylar film scrap, barytes, glass fibers and the like.

In the preparation of the compositions of this invention, the individual ingredients may be pulverized and then thoroughly admixed in the desired proportions. It is also possible to fuse these ingredients to form a liquid, semisolid or solid prereaction product mixture which, if solid, would be ground before use. In each case the resultant mixture provides a composition ready for use in injection, compression and transfer molding operations.

An unexpected benefit of this invention is that a high heat distortion temperature is attained for molded products both prior to and after post curing. A partial cure is promoted while the composition is in the mold, thereby imparting enough physical integrity for removal without damage. After it is removed, the cure is completed. This later cure is what is above referred to as post cure. Heat distortion temperature here is the temperature at which a sample bar will deflect 0.010 in. at a stress load of 264 p.s.i. This is tested by ASTM Method 648-56 (a). The compositions of this invention have heat distortion temperatures approximately 15 percent above that of comparable conventional compositions.

Broadly, the ratio on an equivalent weight basis of anhydride to epoxy resin may range from about 0.3:1 to about 1:1. The acetylacetonate content of this invention may range from about 0.1 to about 10.0 parts by weight per 100 parts of resin.

In one preferred embodiment of this invention the ratio on an equivalent weight basis of anhydride to epoxy resin may range from about 0.5:1 to about 0.7:1. A preferred range of acetylacetonate is from about 1 to about 5 parts by weight per 100 parts resin. Any metal which forms a complex with acetylacetone may be used beneficially. Such metals are zinc, aluminum, iron, copper, cobalt, nickel, magnesium, zirconium and tin. Preferred are zinc, iron, aluminum, copper and cobalt. Most preferred are zinc and iron.

These materials are thoroughly admixed and are then ready for use. One useful process by which the compositions of the present invention can be used is as follows:

The composition is heated to the point of plasticity in a transfer molding apparatus between temperatures of about 120° C. and about 187° C., at which time it flows under pressure of a transfer ram, at a pressure of from about 50 to about 1000 p.s.i., into a mold cavity for the encapsulation of an embedded electronic part. The plastic molding compound remains in the heated mold for a few seconds or minutes until it has sufficient physical integrity to be removed without damage. At that time the encapsulated electronic unit is removed from the mold.

The examples below are given for purposes of illustration and are not intended to be limiting on the present invention. All parts given are parts by weight unless otherwise indicated.

Examples

All examples were prepared in the following manner. Each ingredient was pulverized and then admixed with the other ingredients in the proportions indicated, until a homogeneous blend was obtained. The resulting mixture was heated to 150° C. until cured, (i.e., thermoset or cross-linked). In the compositions of examples 1 through 5 below zinc acetylacetonate was employed as catalyst. The anhydride to epoxy ratio varied as indicated, but the quantity of zinc acetylacetonate remained the same in each example, i.e., 0.2 parts per 10 parts of epoxy resin (2 parts per 100 parts of epoxy resin).

The compositions of examples 1 through 5 were tested for cure time. In addition, the compositions of examples 3 through 5 were tested for quality of cure. These results are presented below in Table I.

The *cure time* was determined as the time required to attain a change from a liquid to a solid, tack-free state.

The *quality of cure* was evaluated in the following manner. Each composition tested was heated at a temperature of 150° C. for 3 minutes to simulate a mold cycle, and thereafter each composition was heated for an additional two hours at 200° C. to simulate a post-curing operation and to insure as complete a cure as practical. A weighed quantity of the cured composition was refluxed with acetone for a period of one hour. The quantity of matter extracted by acetone was determined. Also, the quantity of acetone retained by the composition after extraction and drying of the composition at ambient temperature was determined.

The quality of cure is directly correlated to the quantity of acetone soluble matter. That is, the less acetone soluble matter, the greater the quality of cure. Similarly, the amount of acetone absorbed is a measure of the permeability of the cure composition.

Also presented below in table I are the anhydride to epoxy ratios. These are determined by the formula—

$$\frac{\text{Anhydride equivalents}}{\text{Epoxy equivalents}} = \text{Anhydride epoxy ratio}$$

The epoxide equivalent weight is determined by heating one gram sample of the polyepoxide with an excess of pyridinium chloride dissolved in pyridine at the boiling point for 20 minutes. The excess pyridinium chloride is then back titrated with 0.1 N sodium hydroxide to the phenolphthalein end point. The epoxide value is calculated by considering one HCl as an equivalent of one epoxide.

TABLE I.—COMPOSITIONS

| Example | 1 | 2 | 3 | 4 | 5 |
|---|---|---|---|---|---|
| EPON 1001, solid diglycidyl ether of bisphenol A resin (equivalent wt. 500). | 10 | 10 | 10 | 10 | 10 |
| BTDA (equivalent wt. 161) | 1 | 1.4 | 1.78 | 2.2 | 2.4 |
| Zinc acetylacetonate | 0.2 | 0.2 | 0.2 | 0.2 | 0.2 |
| Anhydride/epoxy ratio* | 0.3/1 | 0.4/1 | 0.6/1 | 0.7/1 | 0.8/1 |
| RESULTS | | | | | |
| Quality of cure | | | | | |
| Percent extracted | (¹) | (¹) | 0.2 | 0.1 | .03 |
| Percent weight gain | (¹) | (¹) | 3.2 | 2.6 | 5.2 |
| Cure time (seconds) | 58 | 59 | 55 | 59 | 61 |

¹ Not tested.
* The anhydride to epoxy ratio determination is illustrated by the following calculation for Example 1 where the equivalent weights are used to determine the ratio.

$$\frac{\text{Anhydride Equivalents}}{\text{Epoxy Equivalents}} = \frac{1/161}{10/500} = 0.3/1$$

Table I shows cure time, constancy of cure time, and quality of cure of compositions using zinc acetylacetonate as a catalyst.

It can be seen from examples 1 through 5 that when zinc acetylacetonate is used a relatively constant cure time of about one minute is obtained though the anhydride to epoxy ratio varies as indicated.

Examples 1 through 5 also illustrate that reduction of quantities of catalyst and anhydride from that conventionally used do not cause a slower cure in zinc acetylacetonate compositions. Example 3 shows that a composition using zinc acetylacetonate will produce a product of superior quality though a relatively small amount of anhydride curing agent is used.

Examples 6 through 12

The following examples 6 through 12 illustrate the effectiveness of zinc, iron, aluminum, magnesium, nickel and zirconium acetylacetonates with four different polycarboxylic acid anhydrides (BTDA, PMDA, tetrachlorophthalic and chlorendic anhydride) as well as a preparation (P-1) prepared in the same manner except acetylacetonate was omitted.

In each example every ingredient was pulverized and then admixed with the other ingredients in amounts indicated, until a homogeneous blend was obtained. The resulting mixture was heated to 150° C. until cured as hereinbefore determined by the change from liquid to a solid tack-free state. A cure time of about 2 to 3 minutes or less at 150° C. is considered most desirable and points up the advantage of the present invention. The cure times and the anhydride to epoxy ratio (A/E) for each example are given below in table II.

TABLE II

| Example | 6 | 7 | 8 | 9 | 10 | 11 | 12 | P-1 |
|---|---|---|---|---|---|---|---|---|
| Epon 1001 | 50 | 10 | 10 | 10 | 10 | 10 | 10 | 10 |
| PMDA | 5 | | | | | | | |
| Chlorendic anhydride | | 4.6 | 1.0 | | | | | 1[note] |
| BTDA | | | | 2.5 | 2.0 | | | 2.0 |
| Tetrachlorophthalic anhydride | | | | | | 4.2 | 4.2 | 4.2 |
| Zinc acetylacetonate | 1.1 | 0.2 | | | | | | |
| Ferric acetylacetonate | | | 0.3 | | | | | |
| Aluminum acetylacetonate | | | | 0.3 | | | | |
| Magnesium acetylacetonate | | | | | 0.5 | | | |
| Nickel acetylacetonate | | | | | | 0.5 | | |
| Zirconium acetylacetonate | | | | | | | 0.5 | |
| Cure time (seconds) | 75 | 65 | 100 | 135 | 150 | 180 | 240 | 117 |
| A/E | 0.4/1 | 0.6/1 | 0.9/1 | 0.6/1 | 0.7/1 | 0.7/1 | 0.7/1 | 0.6/1 |

[1] Minutes.

The cure time in Preparation P-1 where no acetylacetonate is used points out the effectiveness of the various acetylacetonates used as catalysts in examples 6 through 12.

The storage stability of an epoxy composition comprising 24.0% Epon 1001, 4.8% BTDA, 0.7% zinc acetylacetonate, 70% filler and 0.5% release agent and pigment was tested in the following manner.

The composition was stored at 95° F. for a period of 10 days. Standard Spiral flow tests were then performed. In this test compositions are introduced into a mold under prescribed standard conditions to show molding quality by the length of flow in the mold. The tested composition showed only a 24 percent reduction in flow, which is an improvement over comparable conventional compositions by over 30 percent.

In the field of epoxy compositions used in molding operations, heat distortion temperature is important. This is the temperature at which a sample will deflect 0.010 inches at a stress of 264 p.s.i. when tested by appropriate ASTM METHOD, ASTM 648 Method (a). Higher heat distortion temperatures are most desirable in this instance.

There are two stages during the manufacturing process when heat distortion temperature is particularly relevant. First, when the composition is removed from the mold ("as molded") and second, ("postcuring") after it has been completely cured.

A composition of about 24.0% Epon 1001, 4.8% BTDA, 0.7% zinc acetylacetonate, 70% filler and 0.5% release agent and pigment was tested. The heat distortion temperature "as molded" was 142° C. and "postcuring" was 165° C. This is 25° C. to 30° C. higher than comparable conventional compositions, and represents a significant improvement in heat distortion temperature.

While several particular embodiments of this invention are shown above, it will be understood, of course, that the invention is not to be limited thereto, since many modifications may be made.

We claim:

1. A particulate epoxy molding composition consisting essentially of an epoxy resin having a plurality of 1,2-epoxy groups, a cyclic carboxylic acid anhydride and a polyvalent metal complex of acetylacetone, the metal of which is selected from the group consisting of zinc, iron, aluminum, copper, cobalt, tin, magnesium, nickel and zirconium, said complex being present in an amount sufficient to cure the composition within about 4 minutes at cure temperature.

2. An epoxy molding composition consisting essentially of an epoxy resin having a plurality of 1,2-epoxy groups, a cyclic carboxylic acid anhydride and zinc acetylacetonate.

3. An epoxy molding composition consisting essentially of an epoxy resin having a plurality of 1,2-epoxy groups, a cyclic carboxylic acid anhydride and iron acetylacetonate.

4. An epoxy molding composition consisting essentially of an epoxy resin having a plurality of 1,2-epoxy groups, a cyclic carboxylic acid anhydride and aluminum acetylacetonate.

5. An epoxy molding composition consisting essentially of an epoxy resin having a plurality of 1,2-epoxy groups, a cyclic carboxylic acid anhydride and copper acetylacetonate.

6. An epoxy molding composition consisting essentially of an epoxy resin having a plurality of 1,2-epoxy groups, a cyclic carboxylic acid anhydride and cobalt acetylacetonate.

7. An epoxy molding composition consisting essentially of an epoxy resin having a plurality of 1,2-epoxy groups, a cyclic carboxylic acid anhydride and tin acetylacetonate.

8. An epoxy molding composition consisting essentially of an epoxy resin having a plurality of 1,2-epoxy groups, a cyclic carboxylic acid anhydride and magnesium acetylacetonate.

9. An epoxy molding composition consisting essentially of an epoxy resin having a plurality of 1,2-epoxy groups, a cyclic carboxylic acid anhydride and nickel acetylacetonate.

10. An epoxy molding composition consisting essentially of an epoxy resin having a plurality of 1,2-epoxy groups, a cyclic carboxylic acid anhydride and zirconium acetylacetonate.

11. A composition according to claim 1 wherein the polycarboxylic acid anhydride is selected from a group consisting of phthalic anhydride, tetrachlorophthalic anhydride, benzophenonetetracarboxylic dianhydride (BTDA), pyromellitic dianhydride (PMDA), the dianhydride of 1,2,3,4-cyclopentanetetracarboxylic acid (CPDA), trimellitic anhydride, endomethylene tetrahydrophthalic anhydride, chlorendic anhydride, and hexahydrophthalic anhydride.

12. A composition according to claim 1 wherein the ratio on an equivalent weight basis of anhydride to epoxy is from about 0.3:1 to about 1:1.

13. A composition according to claim 1 wherein the metal complex of acetylacetone is present in a concentration of from about 0.1 to about 10 parts by weight per 100 parts resin.

14. An epoxy molding composition consisting essentially of an epoxy resin, having a plurality of 1,2-epoxy groups, a cyclic polycarboxylic acid anhydride and zinc acetylacetonate wherein the ratio on an equivalent weight basis of anhydride to epoxy is from about 0.5:1 to about 0.7:1 and the zinc acetylacetonate is present in an amount ranging from about 1 to about 5 parts by weight per 100 parts resin.

* * * * *